United States Patent
Trim et al.

(10) Patent No.: US 10,627,896 B1
(45) Date of Patent: Apr. 21, 2020

(54) VIRTUAL REALITY DEVICE

(71) Applicant: INTERNATIONAL BUSINESS MACHINES CORPORATION, Armonk, NY (US)

(72) Inventors: Craig M. Trim, Ventura, CA (US); Ahmed Nassar, Pflugerville, TX (US); Victor Povar, Vancouver (CA); Sarbajit K. Rakshit, Kolkata (IN)

(73) Assignee: International Business Machines Coporation, Armonk, NY (US)

( * ) Notice: Subject to any disclaimer, the term of this patent is extended or adjusted under 35 U.S.C. 154(b) by 0 days.

(21) Appl. No.: 16/151,722

(22) Filed: Oct. 4, 2018

(51) Int. Cl.
*G06F 3/01* (2006.01)
*G06K 9/00* (2006.01)
(Continued)

(52) U.S. Cl.
CPC ............ *G06F 3/011* (2013.01); *G06F 3/1454* (2013.01); *G06F 16/24575* (2019.01);
(Continued)

(58) Field of Classification Search
CPC .. G06F 3/011; G06F 3/1454; G06F 26/24575; G06F 2203/011;
(Continued)

(56) References Cited

U.S. PATENT DOCUMENTS 6,795,808 B1 * 9/2004 Strubbe ............... G10L 15/1822
704/275
9,019,174 B2 * 4/2015 Jerauld ................ A61B 5/486
345/8

(Continued)

FOREIGN PATENT DOCUMENTS

| CN | 105872529 A | 8/2016 |
|---|---|---|
| WO | WO2016051366 A2 | 4/2016 |
| WO | WO2018072339 A1 | 4/2018 |

OTHER PUBLICATIONS

Peter Mell et al, The NIST Definition of Cloud Computing, National Institute of Standards and Technology, Publication 800-145, 2011, entire document.

(Continued)

*Primary Examiner* — Ariel A Balaoing
(74) *Attorney, Agent, or Firm* — Patrick J. Daugherty; Daugherty & Del Zoppo Co., LPA

(57) ABSTRACT

Embodiments selectively present of virtual reality device content in response to the excitement of monitored persons. Thus, processors are configured to link a user's virtual reality system to a biometric sensor that acquires biometric data from a monitored person, wherein the virtual reality system is presenting immersive sensory content to the user, and the monitored person is viewing alternative content that is different from the immersive sensory content presented to the user. Processors configured according to the present invention determine whether the monitored person is currently in a threshold state of excitement as a function of biometric data acquired by the biometric sensor; and in response to determining that the monitored person is currently in the threshold state of excitement, automatically switch content presented by the virtual reality system to the user to the alternative content viewed by the monitored person.

16 Claims, 4 Drawing Sheets

(51) Int. Cl.
  *G06F 3/14* (2006.01)
  *G10L 15/26* (2006.01)
  *G10L 15/22* (2006.01)
  *H04N 21/442* (2011.01)
  *H04N 21/41* (2011.01)
  *H04N 21/436* (2011.01)
  *G10L 25/63* (2013.01)
  *G06F 16/2457* (2019.01)

(52) U.S. Cl.
  CPC .......... *G06K 9/00335* (2013.01); *G10L 15/22* (2013.01); *G10L 15/265* (2013.01); *G10L 25/63* (2013.01); *H04N 21/4122* (2013.01); *H04N 21/43615* (2013.01); *H04N 21/44218* (2013.01); *G06F 2203/011* (2013.01)

(58) Field of Classification Search
  CPC ... G06K 9/00335; G10L 15/22; G10L 15/265; G10L 25/63; H04N 21/4122; H04N 21/43615; H04N 21/44218
  See application file for complete search history.

(56) References Cited

U.S. PATENT DOCUMENTS

| | | | | |
|---|---|---|---|---|
| 2005/0113167 | A1* | 5/2005 | Buchner | A63F 13/02 463/30 |
| 2010/0037151 | A1* | 2/2010 | Ackerman | G06Q 10/10 715/753 |
| 2014/0212854 | A1* | 7/2014 | Divakaran | G09B 19/00 434/236 |
| 2015/0355463 | A1* | 12/2015 | Sako | G02B 27/017 345/633 |
| 2017/0068508 | A1* | 3/2017 | Cricri | H04S 7/30 |
| 2017/0173454 | A1 | 6/2017 | Begum et al. | |
| 2017/0293942 | A1* | 10/2017 | Coglitore | A61B 5/0476 |
| 2018/0093185 | A1* | 4/2018 | Black | A63F 13/537 |
| 2018/0260187 | A1* | 9/2018 | Yasuda | H04M 11/06 |

OTHER PUBLICATIONS

Conor Allison, Nintendo may not bring virtual reality to the Switch after all, http://www.wareable.com/vr/nintendo-switch-virtual-reality-release-date-features-price-3665, 2017, entire document.

Eric Johnson, When virtual reality copies real-world games, the fun is in the familiarity, http://www.recode.net/2016/8/28/12676932/virtual-reality-games-motion-controllers-htc-vive-steam, 2016, entire document.

John Gaudiosi, How this 150-year-old company uses virtual reality, Fortune, http://fortune.com/2015/08/25/mccarthy-construction-yr—Various use of VR, 2015, entire document.

Alex Colgan, New Demo: Switch from VR to the Real World with a Simple Gesture, http://blog.leapmotion.com/new-demo-switch-vr-real-world-simple-gesture, 2015, entire document.

* cited by examiner

VIRTUAL REALITY DEVICE

BACKGROUND

Virtual reality (VR) refers to computer and other programmable device technologies that use software to generate realistic images, sounds and other sensations to replicate a real-life or imaginary environment as perceived by a user. VR devices may create an immersive experience, and thereby simulate a user's physical presence in the created environment, to the exclusion of visual, auditory and other sensory data of the actual, physical environment of the user. VR systems are used for gaming, education, simulated travel, remote site tool manipulation and meeting attendance, and other applications.

SUMMARY

In one aspect of the present invention, a computerized method includes executing processes on a computer processor. Thus, a computer processor is configured to link a user virtual reality system to a biometric sensor that acquires biometric data from a monitored person, wherein the virtual reality system is presenting immersive sensory content to the user, and the monitored person is viewing alternative content that is different from the immersive sensory content presented to the user. The configured processor determines whether the monitored person is currently in a threshold state of excitement as a function of biometric data acquired by the biometric sensor; and in response to determining that the monitored person is currently in the threshold state of excitement, automatically switches content presented by the virtual reality system to the user to the alternative content viewed by the monitored person.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to link a user virtual reality system to a biometric sensor that acquires biometric data from a monitored person, wherein the virtual reality system is presenting immersive sensory content to the user, and the monitored person is viewing alternative content that is different from the immersive sensory content presented to the user. The configured processor determines whether the monitored person is currently in a threshold state of excitement as a function of biometric data acquired by the biometric sensor; and in response to determining that the monitored person is currently in the threshold state of excitement, automatically switches content presented by the virtual reality system to the user to the alternative content viewed by the monitored person.

In another aspect, a computer program product for selectively presenting virtual reality device content in response to the excitement of monitored persons has a computer-readable storage medium with computer readable program code embodied therewith. The computer readable program code includes instructions for execution which cause the processor to link a user virtual reality system to a biometric sensor that acquires biometric data from a monitored person, wherein the virtual reality system is presenting immersive sensory content to the user, and the monitored person is viewing alternative content that is different from the immersive sensory content presented to the user. The processor is further caused to determine whether the monitored person is currently in a threshold state of excitement as a function of biometric data acquired by the biometric sensor; and in response to determining that the monitored person is currently in the threshold state of excitement, automatically switch content presented by the virtual reality system to the user to the alternative content viewed by the monitored person.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
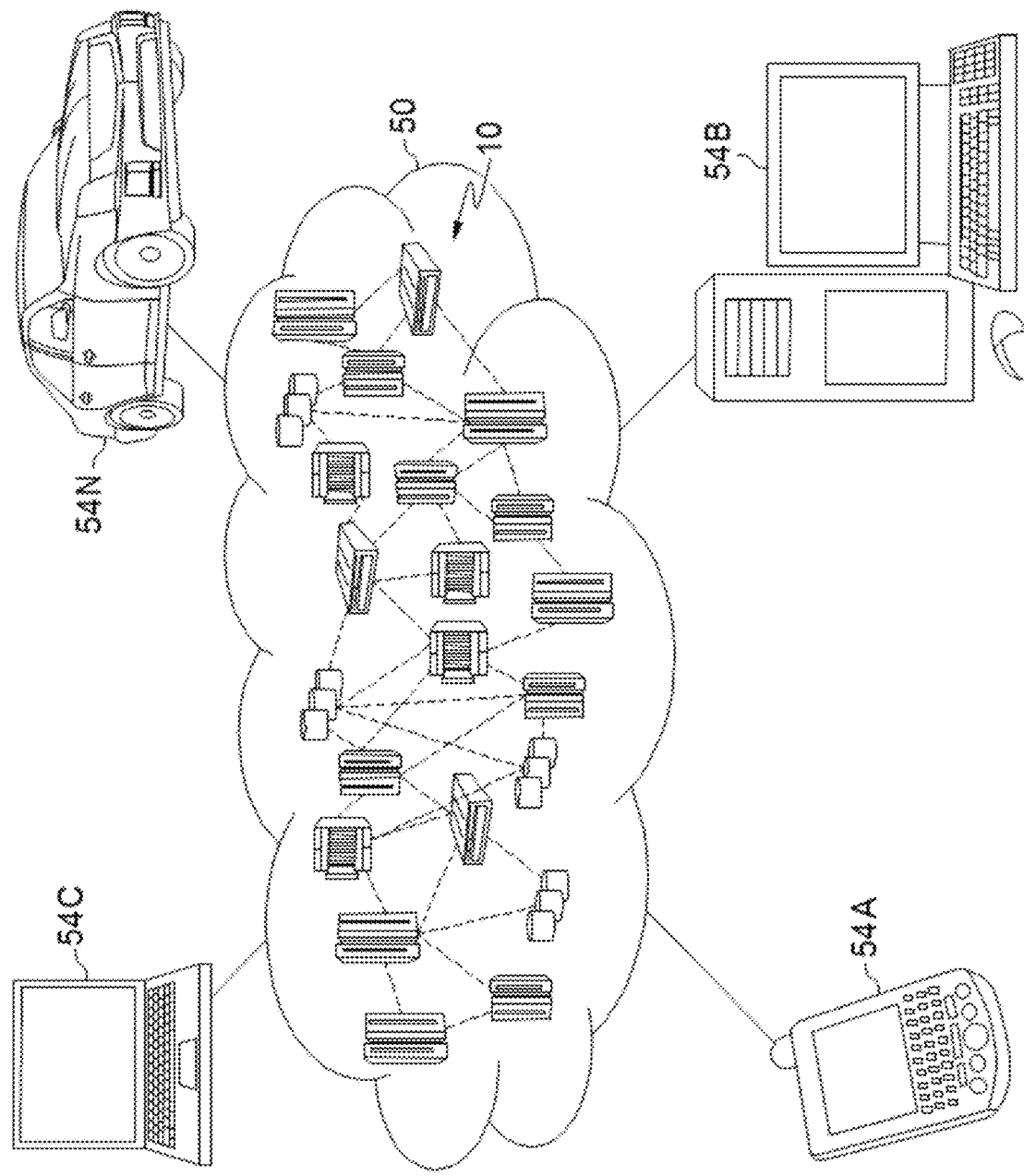
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
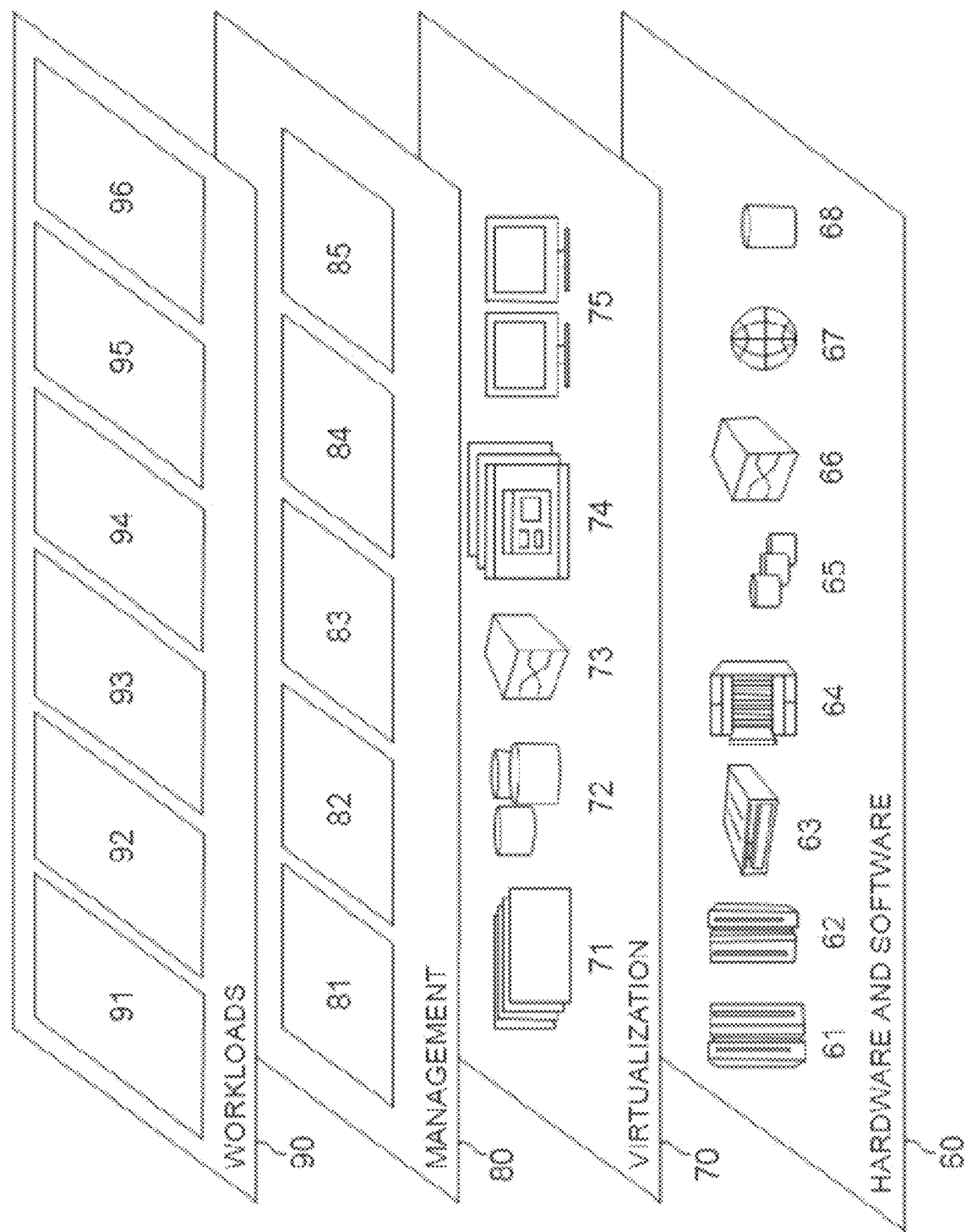
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for selective presentation of virtual reality device content in response to the excitement of monitored persons according to aspects of the present invention 96.

Figure 3:
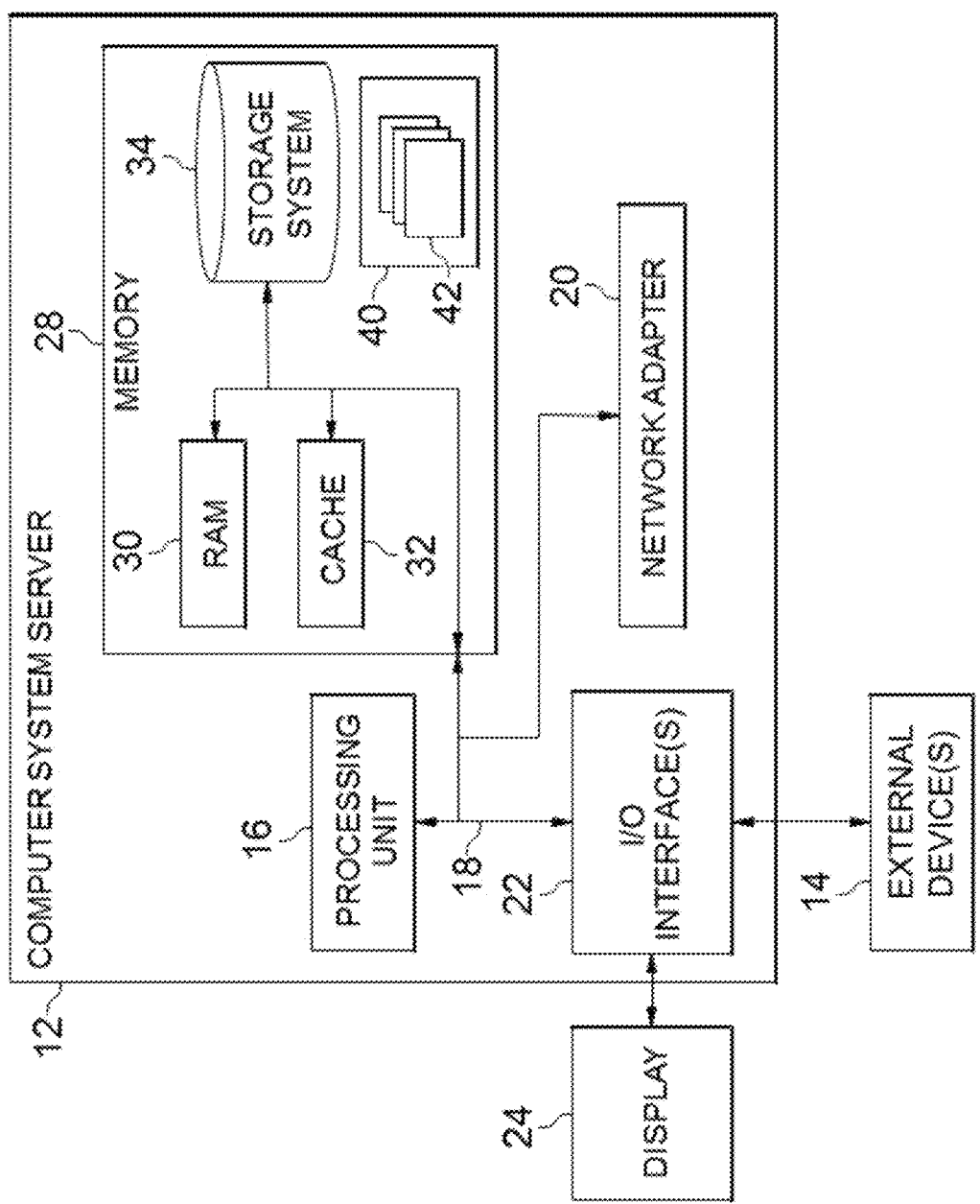
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the carious embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

Figure 4:
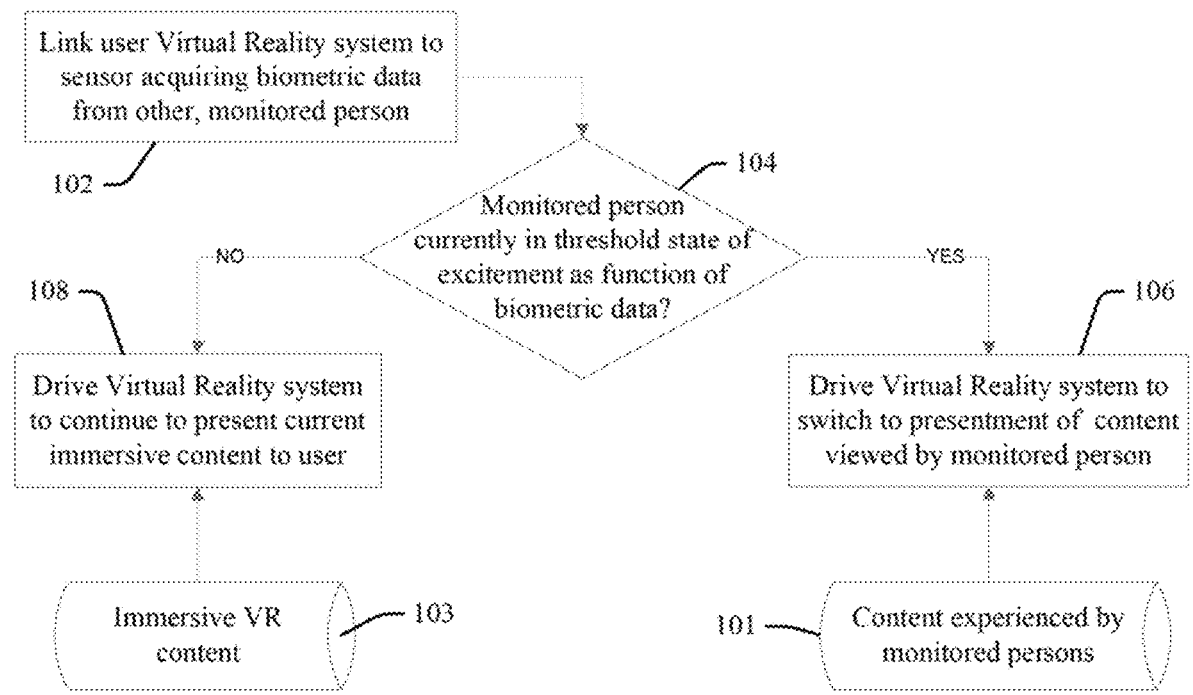
FIG. 4 is a flow chart illustration of an embodiment of the present invention.

FIG. 4 illustrates a system, process or device according to one embodiment of the present invention. At 102 a processor configured according to the present invention (the "configured processor' establishes communication (links, pairs, etc.) of a virtual reality (VR) system that is presenting immersive sensory content to a user with (to) one or more biometric sensory devices that acquire biometric data from one or more other monitored persons that are not participating in experiencing the same immersive, sensory content 103. Generally, the monitored persons are located within a common physical environment of the user, such as within the same room, house, or dormitory building, wherein the user is physically, closely proximate to the monitored persons, but the user is effectively separated from the monitored persons in a cognitive domain, experiencing a different world via the VR device (experiencing simulated travel to a remote site via audio and visual content presentation, playing an immersive video game, etc.), while the monitored persons are watching a television or other audio or visual content presentation of a sporting event, news program, movie, etc., or are engaged in a different video or board game, or are otherwise not sharing the same real or virtual life experience currently engaged by the user via the VR system.

The communication establishes a link or pairing to wearable device sensors that are personal to the monitored persons at 102, such as personal smart phone microphones, cameras, accelerometers, a gyroscopes or other components, fitness trackers, headphone devices, heat-beat sensors, smart watches, etc. Unless the monitored person is a minor or under some type of preauthorization or supervision relationship, they must generally agree to pair their wearable devices with the VR system of the user.

At 104 the configured processor determines whether the monitored person(s) are currently in a threshold state of excitement as a function of the biometric data acquired by the biometric sensory devices in communication with the VR system. For example, wearable devices may continuously gather biometric signal data of the monitored person(s), wherein the configured processor processes the acquired data to determine physical or emotional states of the monitored persons, and thereby determine whether the persons are excited by comparison to threshold biometric data values, including loudness values of vocal utterances, heat-beat rates, respiration rates, physical gesture patterns, muscle tension, etc.

Embodiments may also compare the acquired biometric data to masque or profile data values at 104. For example, embodiments may distinguish excited utterance text values via speech-to-text processing of spoken content that is distinguished within audio data, from other text items that are not recognized as excited utterances or otherwise associated with an excited state. Image or audio data masques of profile values may also be defined and applied, wherein the configured processor recognizes an overall contextual situation that is indicative of excited states of the monitored person by matching the data to excited profiled activities, such as multiple seated persons suddenly standing in unison, or clapping, or hugging or engaging in "high-fiving," or simultaneously uttering a common excited utterance, wherein the configured processor determines the occurrence of threshold excitement occurring at 104 in response to matching the data to the similar contextual situation data.

Figure 5A:
FIGS. 5A and 5B are graphic illustrations of image data processed according to embodiments of the present invention.
Figure 5B:
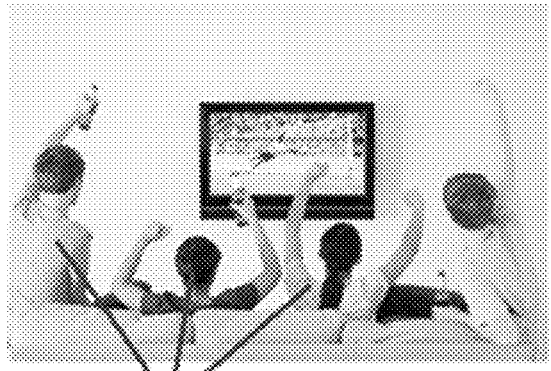

External camera devices installed on, or in the surrounding environment of the other persons, may acquire image data that includes gestures matching excited gesture profile gestures. Thus, the configured processor at 104 may determine gesture data that matched to labelled images or otherwise recognize body languages and other physical movements that are indicative of excited states, as distinguished from un-excited or passive mood states. For example, as illustrated in FIGS. 5A and 5B, the image data acquired from a camera device 202 on the left (5A) shows a group of monitored persons seated on a couch with their hands and arms at repose, or otherwise not raised, while watching televised sporting event content. In contrast, the image data acquired from the camera device 202 in the right illustration (5B) shows people also seated on a couch, but wherein their arms are raised or moving about, and some seem to be rising partially up off of the couch: embodiments of the present invention determine that this type of gesture data meets a threshold excited state for gestures, including in the context defined by the content that they are viewing (a sporting event, as these gestures are typically used to reflect excitement in response to witnessing a surprising or exciting play during a sporting event).

In response to determining that the excitement of the monitored persons meets the defined excitement threshold condition or state at 104, at 106, the configured processor automatically switches the VR device to present the same content 101 that is currently being experienced by the excited, monitored persons. For example, the configured processor switches off the VR system, or switches from the VR system immersive content 103 to the content 101 viewed or experienced by the monitored persons, so that the user can watch a sporting event presented on a television within a room occupied by the user and the monitored persons, the user thereby joining the monitored persons in sharing the experience of viewing the program or other activity 103 that generated the excited state in the monitored person(s). Thus, the user stops being effectively separated from the monitored persons when the configured processor ends the immersive content presentation at 106, and joins the monitored persons in a common, shared activity or sensory experience.

In contrast, in response to determining at 104 that none of the other, monitored persons meets the defined excitement threshold condition or state, the configured processor drives the VR device at 108 to continue to present the immersive VR content 103 to the user.

Thus, in one example a user "A" is using a VR system to manipulate virtual equipment to perform a surgical simulation as part of homework assignment that has audio and video content that immerses the user A into an "operating room" environment of the game. While the user A is engaged in this immersive content, friends B, C and D are present within the same room as the user A but are watching a sporting event on a television, or through a window of the room (such as in a loge in an arena, or on a field visible through a window of the room, etc.). While user A is also interested in the sporting event, and in generally sharing the experience of watching the event with the other persons B, C and D, user A must complete the "operating room" simulation by tomorrow, and therefore user A sets the configured processor to only interrupt the immersive content to enable user A to watch the event or share the experience if something significant happens, like if one team is about to score a goal, or has scored a goal, which is signified by associated excitement occurring in the other, monitored persons (cheering, agitation, excited gestures or utterances, etc.).

Accordingly, aspects of the present invention automatically and dynamically switch content presentation by the VR device to present the actual, physical surroundings of user A, so that user A experiences the same content as that experienced by the excited, monitored other persons, in real time, in response to determining that the surrounding, monitored persons are currently excited. Thus, when the excitement is caused by the imminent scoring of a goal (for example, a star player is preparing to take a penalty kick), the user A joins the other persons B, C, and D in sharing the experience before the kick, and thereby experiences seeing the actual shot and goal with B, C and D. In contrast, under the prior art user A would have missed the shot entirely, due to the immersive nature of content that the VR device would have otherwise presented to the user without the intervention of the configured processor.

Some embodiments select subsets of the other persons for excitement monitoring, such as designated important or influential persons. For example the configured processor may acquire biometric data for only a spouse of the user that is within a group of "other persons" that are watching an event or engaged in some other activity, wherein the user only wants to switch out of the current immersive VR content when the spouse is excited, so that the user may share the apparently-significant or exciting experience with their spouse, but wherein the user does not choose to switch out (at 106, FIG. 4) if others are excited but not their spouse.

Embodiments may also acquire biometric data for persons that are physically remote from the user. For example, the other, monitored persons may be friends in a common room within a dormitory that are watching a televised sporting event on a designated television channel, wherein the user is in his or her dorm room that is remote from the common room (for example, on a different floor, or in a different building) and using the VR device to experience different presentation content to complete a study assignment, or do research, play a game, etc. Thus, determination of excitement of one or more of the monitored persons (at 104, FIG. 4) results in the configured processor causing the user's VR device to (at 106, FIG. 4) immediately switch from whatever current immersive or isolating content that is present to the user to a television content application or browser that presents the same designated television channel and sporting event presentation that is currently being experienced by the friends, wherein the user instantaneously shares the same viewing experience with his or her friends in that remote, other physical environment.

Thus, embodiments provide advantages over the prior art by reducing the amount or quality of separation from friends and other persons that the user of VR system may experience. While VR systems offer exciting and efficient potentials for essentially transporting a user out of their current surroundings into another, virtual environment, such mechanisms correspondingly isolate the user from real-life people and experiences otherwise presented to the user. By dynamically switching-off immersive content in real-time in response to determining rising or threshold excitement levels detected in monitored friends, social contacts or other surrounding persons, embodiments prevent VR systems from isolating users from other people when exciting events are happening, so that the users don't miss out on sharing exciting or quality real-life experiences with other persons due to the immersive and personally exclusive nature of VR system presentations.

What is claimed is:

1. A computer-implemented method, comprising executing on a computer processor:

linking a user virtual reality system to a biometric sensor that acquires biometric data from a monitored person, wherein the virtual reality system is presenting immersive sensory content to the user, and the monitored person is viewing alternative content that is different from the immersive sensory content presented to the user;

determining whether the monitored person is currently in a threshold state of excitement as a function of biometric data acquired by the biometric sensor; and in response to determining that the monitored person is currently in the threshold state of excitement, automatically switching content presented by the virtual reality system to the user to the alternative content viewed by the monitored person, wherein the automatically switching the content presented by the virtual reality system to the alternative content viewed by the monitored person comprises driving a television content application to present a same designated television channel presentation that is currently being viewed by the monitored person.

2. The method of claim 1, wherein the determining that the monitored person is currently in the threshold state of excitement comprises identifying the occurrence of excited utterances within speech-to-text processing outputs from spoken content biometric data.

3. The method of claim 1, wherein the determining that the monitored person is currently in the threshold state of excitement comprises matching gestures within image data of the biometric data to excited gesture profile gestures.

4. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the linking the user virtual reality system to the biometric sensor, the determining whether the monitored person is currently in the threshold state of excitement, and the automatically switching content presented by the virtual reality system to the alternative content viewed by the monitored person.

5. The method of claim 4, wherein the computer-readable program code is provided as a service in a cloud environment.

6. The method of claim 1, wherein the biometric sensor is selected from the group consisting of a smart phone microphone, a camera, an accelerometer, a gyroscope component, a fitness tracker, a heart-beat sensor, and a smart watch.

7. The method of claim 6, wherein the biometric data acquired by the biometric sensor is selected from the group consisting of a loudness level of a vocal utterance, a heart-beat rate, a respiration rate, a gesture pattern and a muscle tension value.

8. A system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

links a user virtual reality system to a biometric sensor that acquires biometric data from a monitored person, wherein the virtual reality system is presenting immersive sensory content to the user, and the monitored person is viewing alternative content that is different from the immersive sensory content presented to the user;

determines whether the monitored person is currently in a threshold state of excitement as a function of biometric data acquired by the biometric sensor; and in response to determining that the monitored person is currently in the threshold state of excitement, automatically switches content presented by the virtual reality system to the user to the alternative content viewed by the monitored person by driving a television content application to present a same designated television channel presentation that is currently being viewed by the monitored person.

9. The system of claim 8, wherein the processor executes the program instructions stored on the computer-readable storage medium via the computer readable memory and thereby determines that the monitored person is currently in the threshold state of excitement by identifying the occurrence of excited utterances within speech-to-text processing outputs from spoken content biometric data.

10. The system of claim 8, wherein the processor executes the program instructions stored on the computer-readable storage medium via the computer readable memory and thereby determines that the monitored person is currently in the threshold state of excitement by matching gestures within image data of the biometric data to excited gesture profile gestures.

11. The system of claim 8, wherein the biometric sensor is selected from the group consisting of a smart phone microphone, a camera, an accelerometer, a gyroscope component, a fitness tracker, a heart-beat sensor, and a smart watch.

12. The system of claim 9, wherein the biometric data acquired by the biometric sensor is selected from the group consisting of a loudness level of a vocal utterance, a heart-beat rate, a respiration rate, a gesture pattern and a muscle tension value.

13. A computer program product for selective presentation of virtual reality device content in response to excitement of a monitored person, the computer program product comprising:

a computer readable storage medium having computer readable program code embodied therewith, the computer readable program code comprising instructions for execution by a processor that cause the processor to:

link a user virtual reality system to a biometric sensor that acquires biometric data from a monitored person, wherein the virtual reality system is presenting immersive sensory content to the user, and the monitored person is viewing alternative content that is different from the immersive sensory content presented to the user;

determine whether the monitored person is currently in a threshold state of excitement as a function of biometric data acquired by the biometric sensor; and in response to determining that the monitored person is currently in the threshold state of excitement, automatically switch content presented by the virtual reality system to the user to the alternative content viewed by the monitored person by driving a television content application to present a same designated television channel presentation that is currently being viewed by the monitored person.

14. The computer program product of claim 13, wherein the computer readable program code instructions for execution by the processor further cause the processor to determine that the monitored person is currently in the threshold state of excitement by identifying the occurrence of excited utterances within speech-to-text processing outputs from spoken content biometric data.

15. The computer program product of claim 13, wherein the computer readable program code instructions for execution by the processor further cause the processor to determine that the monitored person is currently in the threshold state of excitement by matching gestures within image data of the biometric data to excited gesture profile gestures.

16. The computer program product of claim 13, wherein the biometric sensor is selected from the group consisting of a smart phone microphone, a camera, an accelerometer, a gyroscope component, a fitness tracker, a heart-beat sensor, and a smart watch; and wherein the biometric data acquired by the biometric sensor is selected from the group consisting of a loudness level of a vocal utterance, a heart-beat rate, a respiration rate, a gesture pattern and a muscle tension value.

* * * * *